United States Patent
Balin et al.

(10) Patent No.: US 12,443,743 B2
(45) Date of Patent: Oct. 14, 2025

(54) DYNAMIC CROSS-STANDARD COMPLIANCE COVERAGE

(71) Applicant: Dell Products L.P., Round Rock, TX (US)

(72) Inventors: Maxim Balin, Gan-Yavne (IL); Stav Sapir, Beer Sheba (IL)

(73) Assignee: Dell Products L.P., Round Rock, TX (US)

(*) Notice: Subject to any disclaimer, the term of this patent is extended or adjusted under 35 U.S.C. 154(b) by 233 days.

(21) Appl. No.: 18/086,116

(22) Filed: Dec. 21, 2022

(65) Prior Publication Data

US 2024/0211623 A1 Jun. 27, 2024

(51) Int. Cl.
| | |
|---|---|
| G06F 21/62 | (2013.01) |
| G06F 21/57 | (2013.01) |
| H04W 12/02 | (2009.01) |
| G06F 21/41 | (2013.01) |
| H04L 9/08 | (2006.01) |

(52) U.S. Cl.
CPC ........ G06F 21/6236 (2013.01); G06F 21/577 (2013.01)

(58) Field of Classification Search
CPC ............................ G06F 21/6236; G06F 21/577
See application file for complete search history.

(56) References Cited

U.S. PATENT DOCUMENTS

| | | | |
|---|---|---|---|
| 2019/0018968 A1* | 1/2019 | Ronca | G06F 21/577 |
| 2019/0286825 A1 | 9/2019 | Ponnuru et al. | |
| 2019/0294800 A1* | 9/2019 | Andrews | G06F 21/602 |
| 2021/0279352 A1 | 9/2021 | Ali et al. | |
| 2022/0150281 A1* | 5/2022 | Kanungo | H04L 63/20 |
| 2024/0273214 A1* | 8/2024 | Bolukbas | G06F 21/577 |

FOREIGN PATENT DOCUMENTS

WO WO-2018027244 A3 * 5/2018 ............. G06F 21/57

OTHER PUBLICATIONS

Raiff Silva, Andrey Brito, Jan Paulo de Lima Filho; "Automation of Security Controls for Continuous Compliance in Vulnerability Management"; LADC '24: Proceedings of the 13th Latin-American Symposium on Dependable and Secure Computing; Nov. 2024; pp. 1-10 (Year: 2024).*

* cited by examiner

*Primary Examiner* — Amir Mehrmanesh
*Assistant Examiner* — Courtney D Fields
(74) *Attorney, Agent, or Firm* — Larson Newman, LLP

(57) ABSTRACT

An information handling system includes a memory and a processor. The memory stores a compliance node environment. The processor creates the compliance node environment. In response to reception of a compliance update, the processor stores the compliance update. Based on the compliance update, the processors determine a first compliance coverage for a sub-domain of a compliance type in the compliance node environment. Based on the first compliance coverage for the sub-domain, the processors determine a second complete coverage for the compliance type associated with the sub-domain.

20 Claims, 7 Drawing Sheets

DYNAMIC CROSS-STANDARD COMPLIANCE COVERAGE

FIELD OF THE DISCLOSURE

The present disclosure generally relates to information handling systems, and more particularly relates to dynamic cross-standard compliance coverage.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a processor. The memory may store a compliance node environment. The processor may create the compliance node environment. In response to reception of a compliance update, the processor may store the compliance update. Based on the compliance update, the processor may determine a first compliance coverage for a sub-domain of a compliance type in the compliance node environment. Based on the first compliance coverage for the sub-domain, the processor may determine a second complete coverage for the compliance type associated with the sub-domain.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
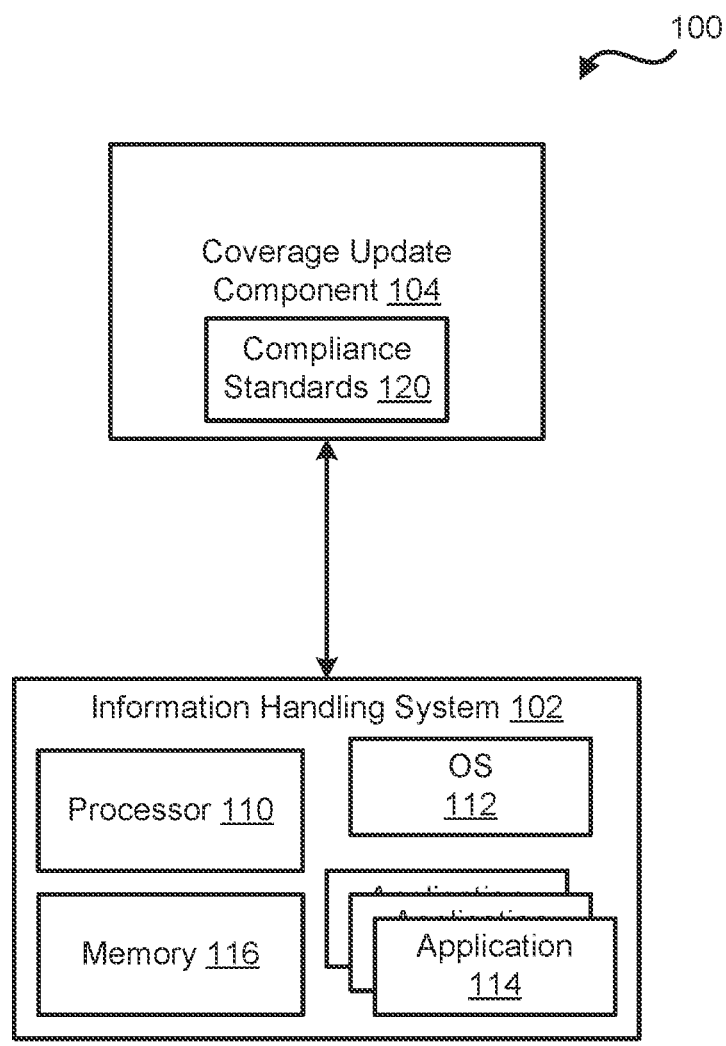
FIG. 1 is a block diagram of a system including an information handling system and a coverage update component according to at least one embodiment of the present disclosure.

FIG. 1 illustrates a system 100 according to at least one embodiment of the present disclosure. System 100 includes an information handling system 102 and a coverage update component 104. Information handling system 102 includes a processor 110, an operating system (OS) 112, multiple applications 114, and a memory 116. Coverage update component 104 includes one or more compliance standards 120. System 100 may include any suitable number of additional components or information handling systems without varying from the scope of this disclosure.

In an example, coverage update component 104 may provide compliance or security updates to information handling system 102. The compliance or security updates for be any product, such as OS 112 and applications 114, within information handling system 102. In certain examples, each time compliance updates are provided to information handling system 102, processor 110 may perform one or more suitable operations to determine whether the systems or products within the information handling system are compliant. In an example, based on the compliance updates, processor 110 may create a compliance node environment, such as compliance node environment 200 of FIG. 2, and store the compliance node environment in memory 116.

In certain examples, security compliance may be an important factor for products, such as OS 112 and applications 114, within information handling system 102. Many compliance standards, such as NIST, CIS, MITTRE, may have a vast list of requirements that the product should address. These requirements may create challenges within information handling system 102, such as to constantly preserve desired level of compliance during the product live cycle. In an example, compliance may be defined as an evaluation that represents a status of the products, such as OS 112 and applications 114, within information handling system 102 a point of time.

In an example, information handling system 102 may be improved by processor 110 performing one or more operations to simplify the compliance process. In certain examples, processor 110 may simplify the compliance process by transforming compliance requirements into a logical model. For example, processor 110 may build or create logical relationships between compliance types for the products. In an example, the logical relationships may be created based on any suitable data or criteria. In an example, compliance standards may have similarities in content and requirements, processor 110 may keep track of all compliance standards by mapping similar requirements between compliance standards, and product features and capabilities.

FIGS. 2-5 are diagrams of a compliance node environment 200 according to at least one embodiment of the present disclosure. Compliance node environment 200 includes multiple compliance types 202, 204, and 206. Compliance type 202 includes a sub-domain 210, compliance type 204 includes sub-domains 220 and 222, and compliance type 206 includes sub-domains 230, 232, and 234. In an example, each sub-domain 210, 220, 222, 230, 232, and 234 may have a unique identifier and a type that represents the compliance.

In certain examples, each sub-domain may be different and associated with a particular compliance type. For example, compliance type 202 may be CIS and sub-domain 210 may be a section 1.1 sub-domain of CIS compliance type. Compliance type 204 may be NIST 800-53, sub-domain 220 may be a section PM-8 of NIST 800-53, and sub-domain 222 may be section PM-5 of NIST 800-53. Similarly, compliance type 206 may be NIST CSF, sub-domain 230 may be section AM-1 of NIST CSF, sub-domain 232 may be section AM-2 of NIST CSF, and sub-domain 234 may be section DS-3 of NIST CSF.

In an example, the connection between subdomains from different compliance types may be done by Cyber Security Subject Matter Expert (SME). The different sub-domains of compliance types 202, 204, and 206 may have directional relations between different compliance types of requirements. In an example, a relation may be defined as is a binary function that states whether a sub-domain is compliant or uncompliant. In certain examples, each pair of nodes, or sub-domains, that have a logical connection may have two relations so that each node is both a source and destination as illustrated by the combination of FIGS. 2 and 3.

Figure 2:
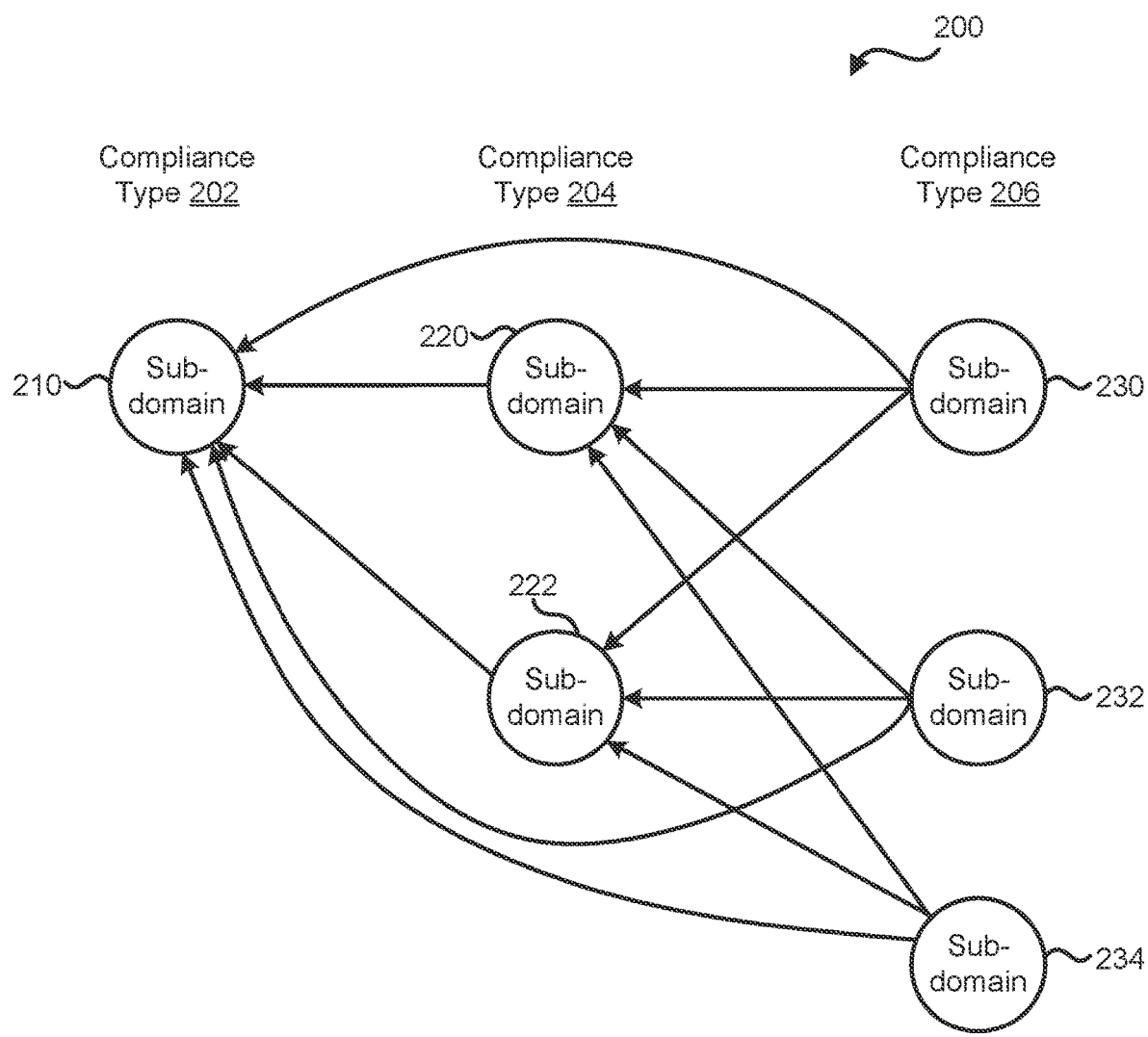
FIGS. 2-5 are diagrams of a compliance node environment according to at least one embodiment of the present disclosure.

FIG. 2 illustrates a first direction of directional relationships among sub-domains 210, 220, 222, 230, 232, and 234 of compliance types 202, 204, and 206 according to at least one embodiment of the present disclosure. For example, sub-domain 230 of compliance type 206 is a source to sub-domains 220 and 222 of compliance type 204 and to sub-domain 210 of compliance type 202. Similarly, sub-domain 232 of compliance type 206 is a source to sub-domains 220 and 222 of compliance type 204 and to sub-domain 210 of compliance type 202. Sub-domain 234 of compliance type 206 is a source to sub-domains 220 and 222 of compliance type 204 and to sub-domain 210 of compliance type 202. Sub-domain 220 of compliance type 204 is a source to sub-domain 210 of compliance type 202, and sub-domain 222 of compliance type 204 is a source to sub-domain 210 of compliance type 202.

Figure 3:
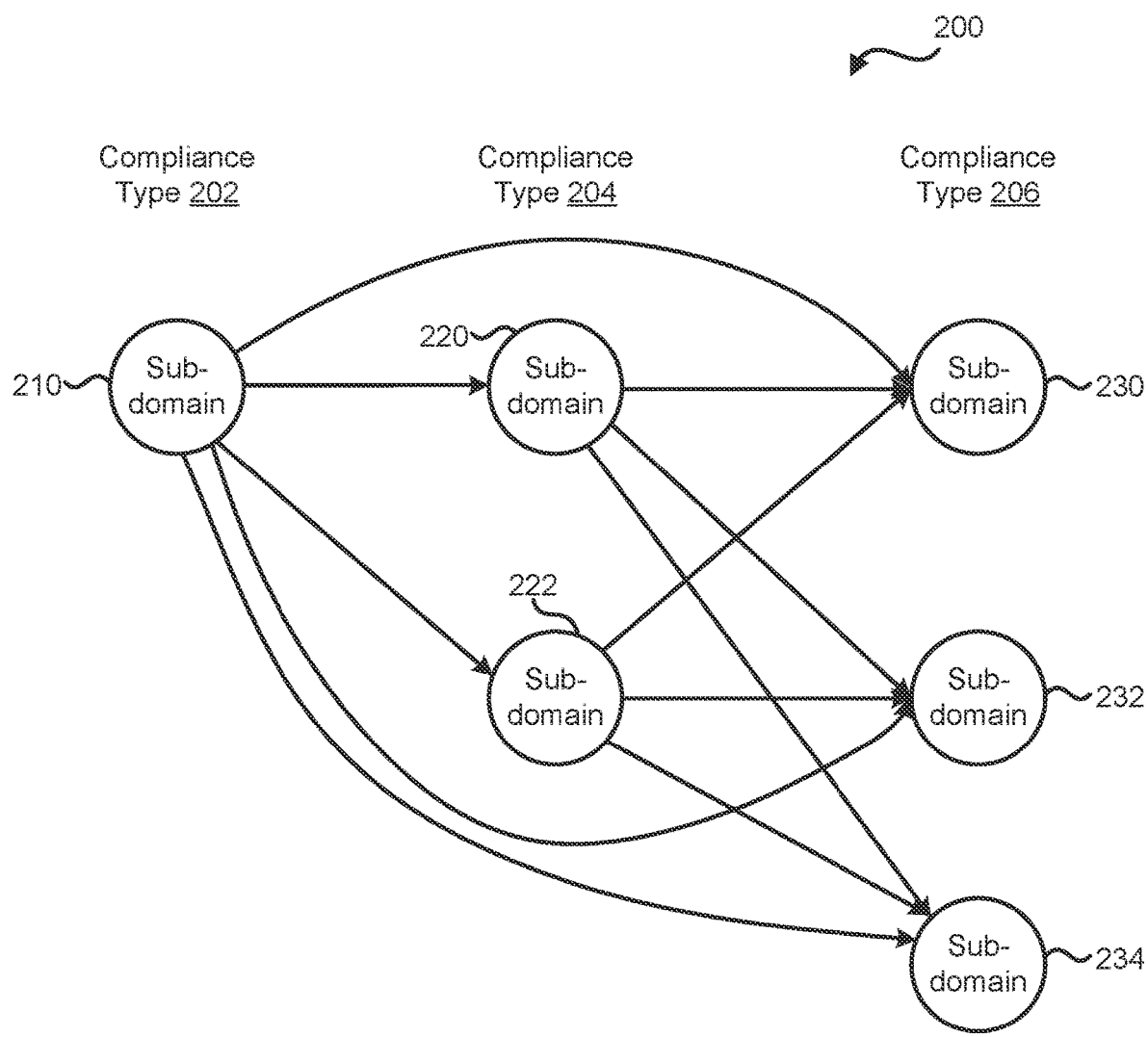

FIG. 3 illustrates a second direction of directional relationships among sub-domains 210, 220, 222, 230, 232, and 234 of compliance types 202, 204, and 206 according to at least one embodiment of the present disclosure. For example, sub-domain 210 of compliance type 202 is a source to sub-domains 220 and 222 of compliance type 204 and to sub-domains 230, 232, and 234 of compliance type 206. Sub-domain 220 of compliance type 204 is a source to sub-domains 230, 232, and 234 of compliance type 206. Similarly, sub-domain 222 of compliance type 204 is a source to sub-domains 230, 232, and 234 of compliance type 206.

Figure 4:
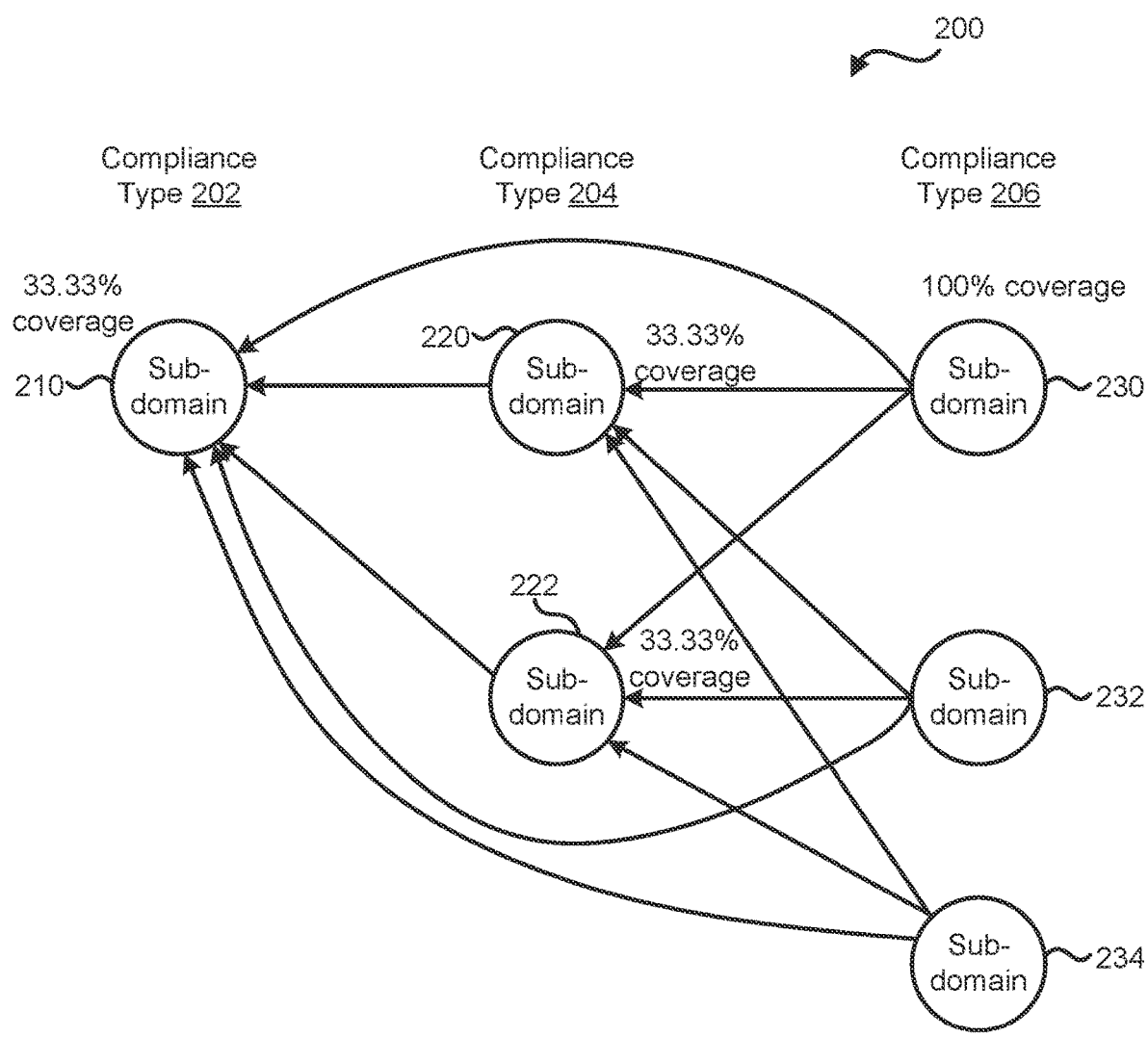
Figure 5:
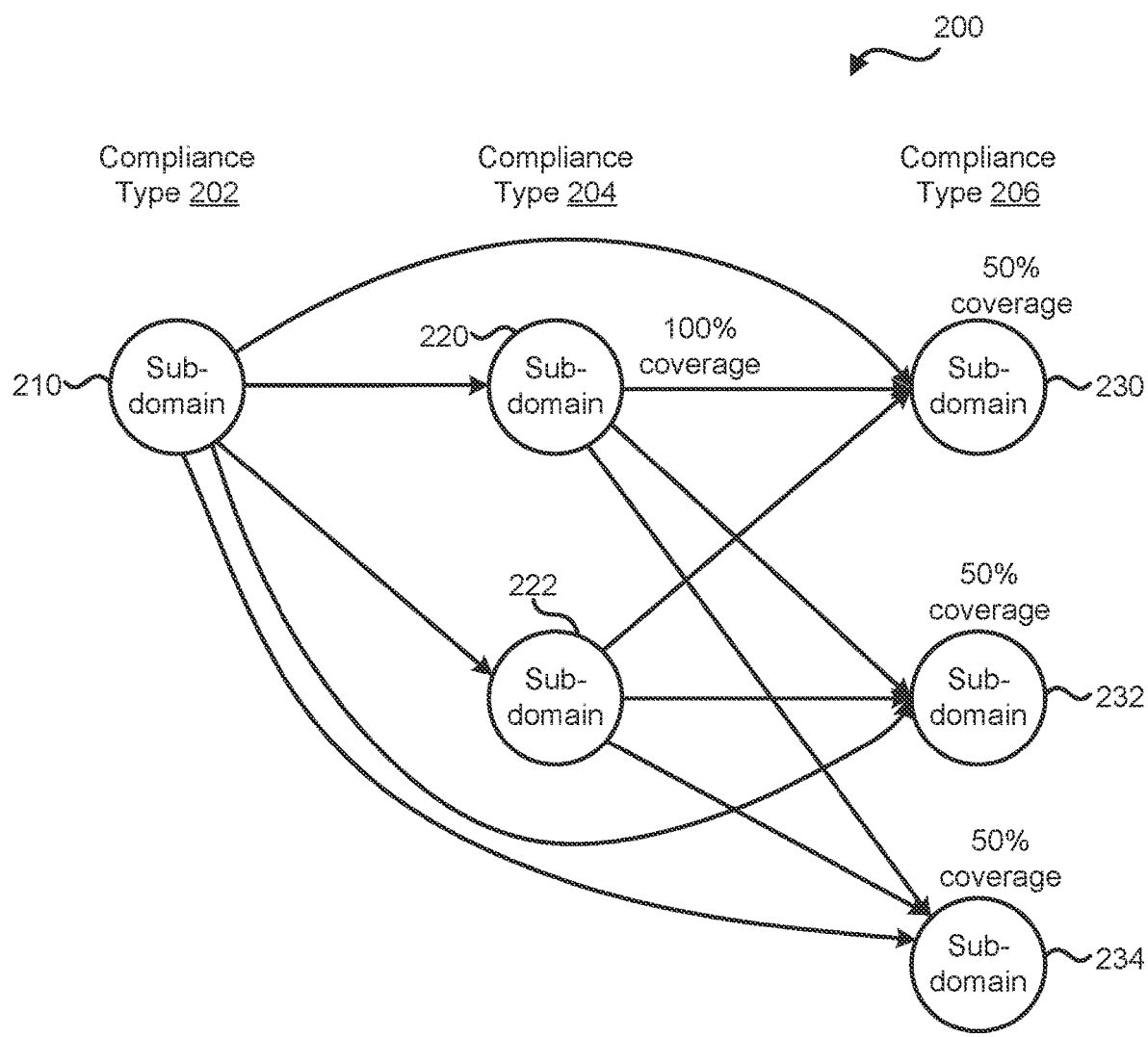

FIGS. 4 and 5 illustrate compliance coverages for compliance node environment 200 according to at least one embodiment of the present disclosure. In an example, processor 110 may calculate or determine a percentage of compliance coverage for a destination sub-domain, such as sub-domain 220 based on a number of complaint source sub-domains and a total number of source sub-domains for the particular destination sub-domain. In certain examples, an amount of incoming relations ratio, or percentage of compliance coverage, is based on source sub-domains from the same compliance type.

In an example, if a node or sub-domain has incoming compliance relationships from sub-domains of more than one compliance type, processor 110 may set a maximum compliance coverage for that sub-domain. For example, sub-domain 210 has incoming compliance relationships from sub-domains 220 and 222 from compliance type 204 and incoming compliance relationships from sub-domains 230, 232, and 234 from compliance type 206. Thus, sub-domain 210 has incoming compliance relationships from sub-domains in two compliance types 204 and 206, such that processor 110 may set a maximum compliance coverage for sub-domain 210.

In certain examples, any of sub-domains 210, 220, 222, 230, 232, and 234 may be have its security coverage updated by external entity, such as coverage update component 104 in FIG. 1. In an example, coverage update component 104 may be utilized by a dev team, information technology expert, or the like to store compliance standards or types 120 and to push these compliance standards to information handling system 102. In response to receiving the update coverage, processor 110 of FIG. 1 may perform the update to the corresponding one of sub-domains 210, 220, 222, 230, 232, and 234. After one of sub-domains 210, 220, 222, 230, 232, and 234 has been updated, processor 110 of FIG. 1 may propagate the state change for the sub-domain within compliance node environment 200. For example, processor 110 of FIG. 1 may be propagated a logic of compliance between all connected sub-domains 210, 220, 222, 230, 232, and 234.

In certain examples, processor 110 may set a compliance relationship between two sub-domains to 'compliant' when the source sub-domain is 100% covered with respect to security compliances. Referring to FIG. 4, processor 110 of FIG. 1 may calculate or determine a compliance type coverage as an average of the coverage percentage of sub-domains within the same compliance type. For example, sub-domain 230 of compliance type 206 may be a source node to destination sub-domains 220 and 222 of compliance type 204 and to destination sub-domain 210 of compliance type 202. In an example, if sub-domain 230 reaches 100% coverage, as illustrated in FIG. 4, then the relationship between sub-domain 230 and sub-domain 220, the relationship between sub-domain 230 and sub-domain 222 and the relationship between sub-domain 230 and sub-domain 210 may become 'compliant'. In certain examples, processor 110 of FIG. 1 may calculate or determine a degree of incoming relationships for sub-domains 210, 220, and 222 from compliance type 206 is three based on sub-domains 230, 232, and 234 being source sub-domains.

In an example, processor 110 of FIG. 1 may utilize the coverage percentage for each of sub-domains 210, 220, and 222 based on the security coverage of each of sub-domains 230, 232, and 234. In this example, the coverage percentage may be one out of three or 33.33%. Processor 110 may also calculate or determine the coverage for compliance type 206 based on any suitable calculations, such as an average of the compliance coverages of sub-domains 230 (100%), 232 (0%), and 234 (0%). For example, the coverage for compliance type 206 may be (100%+0%+0%)/3=33%. Processor 110 may also calculate or determine the coverage for compliance type 204 based on the coverages of sub-domains 220 (33%) and 222 (33%). In this example, the coverage for compliance type 204 may be (33%+33%)/2=33%. Processor 110 may also calculate or determine the coverage for compliance type 202 based on the coverage of sub-domain 210 (33%).

Referring to FIG. 5, coverage update component 104 may push updated compliance standards to information handling system 102. In response to receiving the updated coverage, processor 110 may perform the update to the corresponding one of sub-domains 210, 220, 222, 230, 232, and 234. For example, sub-domain 220 of compliance type 204 may be updated to 100% as illustrated in FIG. 5. Based on the coverage of sub-domain 220 being at 100% the relationship between sub-domain 220 and sub-domain 230, the relationship between sub-domain 220 and sub-domain 232 and the relationship between sub-domain 220 and sub-domain 234 may all become 'compliant'. In certain examples, processor 110 of FIG. 1 may calculate or determine a degree of incoming relationships for sub-domains 230, 232, and 234 from compliance type 204 may be two based on sub-domains 220 and 222 being source sub-domains.

In an example, processor 110 may calculate or determine the coverage percentage for each of sub-domains 230, 232, and 234 based on the security coverage of each of sub-domains 220 and 222. In this example, the coverage percentage may be one out of two or 50%. Processor 110 may also calculate or determine the coverage for compliance type 206 based on any suitable calculations, such as an average of the compliance coverages of sub-domains 230 (50%), 232 (50%), and 234 (50%). For example, the coverage for compliance type 206 may be (50%+50%+50%)/3=50%. Processor 110 may also calculate or determine the coverage for compliance type 204 based on the coverages of sub-domains 220 (100%) and 222 (0%). In this example, the coverage for compliance type 204 may be (100%+0%)/2=50%.

As described above, security in information handling system 102 may be improved by processor 110 suppling proof of implementation due to duologies in the compliance process. Processor 110 may also calculate or determine security maturity during the entire life cycle of information handling system 102. Processor may further improve information handling system 102 by calculating any security risk according to percentage/strengths of security compliances. For example, any security risk may be related to the compliance coverages for the compliance types 202, 204, and 206 and related to the compliance coverages for sub-domains 210, 220, 222, 230, 232, and 234.

Processor 110 may receive dynamic modifications the security compliances requirements from coverage update component 104 and based on the updated requirements, the processor may dynamically calculate or determine new compliance coverages for the compliance types 202, 204, and 206 and related to the compliance coverages for sub-domains 210, 220, 222, 230, 232, and 234. Processor 110 may implement a high trustworthiness level of security compliance through the non-forgeable processes described above.

Figure 6:
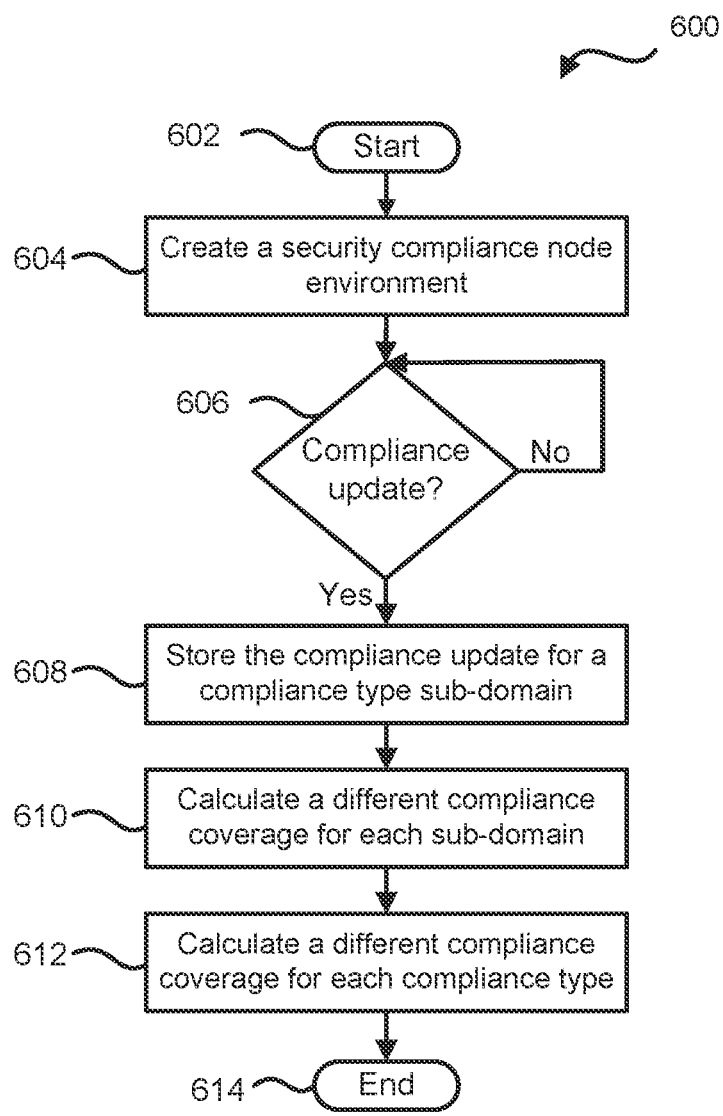
FIG. 6 is a flow diagram of a method for dynamically updated security compliances based on updated compliance requirements according to at least one embodiment of the present disclosure.

FIG. 6 illustrates a flow of a method 600 for FIG. 6 is a flow diagram of a method for dynamically updated security compliances based on updated compliance requirements according to at least one embodiment of the present disclosure according to at least one embodiment of the present disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure.

At block 604, a security compliance node environment is created. In an example, the security compliance node environment may be created by a processor of an information handling system. The security compliance may be associated with one or more products, such as an OS and applications, within the information handling system. In an example, the security compliance node environment may include multiple compliance types and each compliance type may include one or more sub-domains or nodes associated with the respective compliance type. The different sub-domains from different compliance types may have a compliant relationship with the different sub-domains of different compliance types.

At block 606, a determination is made whether a compliance requirement update has been received. In an example, the compliance update may be received from any suitable component in communication with the information handling system, such as a coverage update component that is external to the information handling system. The compliance update may be associated with another one of the sub-domains with the security compliance node environment.

In response to a compliance update being received, the compliance update for a compliance type sub-domain is stored at block 608. In an example, the compliance update may change any suitable compliance percentages of other sub-domains within the security compliance node environment. In certain examples, the compliance update may indicate that a particular sub-domain is 100% compliant. Based on the stored compliance update, different compliance coverages are calculated or determined for each sub-domain at block 610. At block 612, different compliance coverages are calculated or determined for each compliance type and the flow ends at block 614. In an example, the compliance coverages may be calculated or determined as a percentage value.

Figure 7:
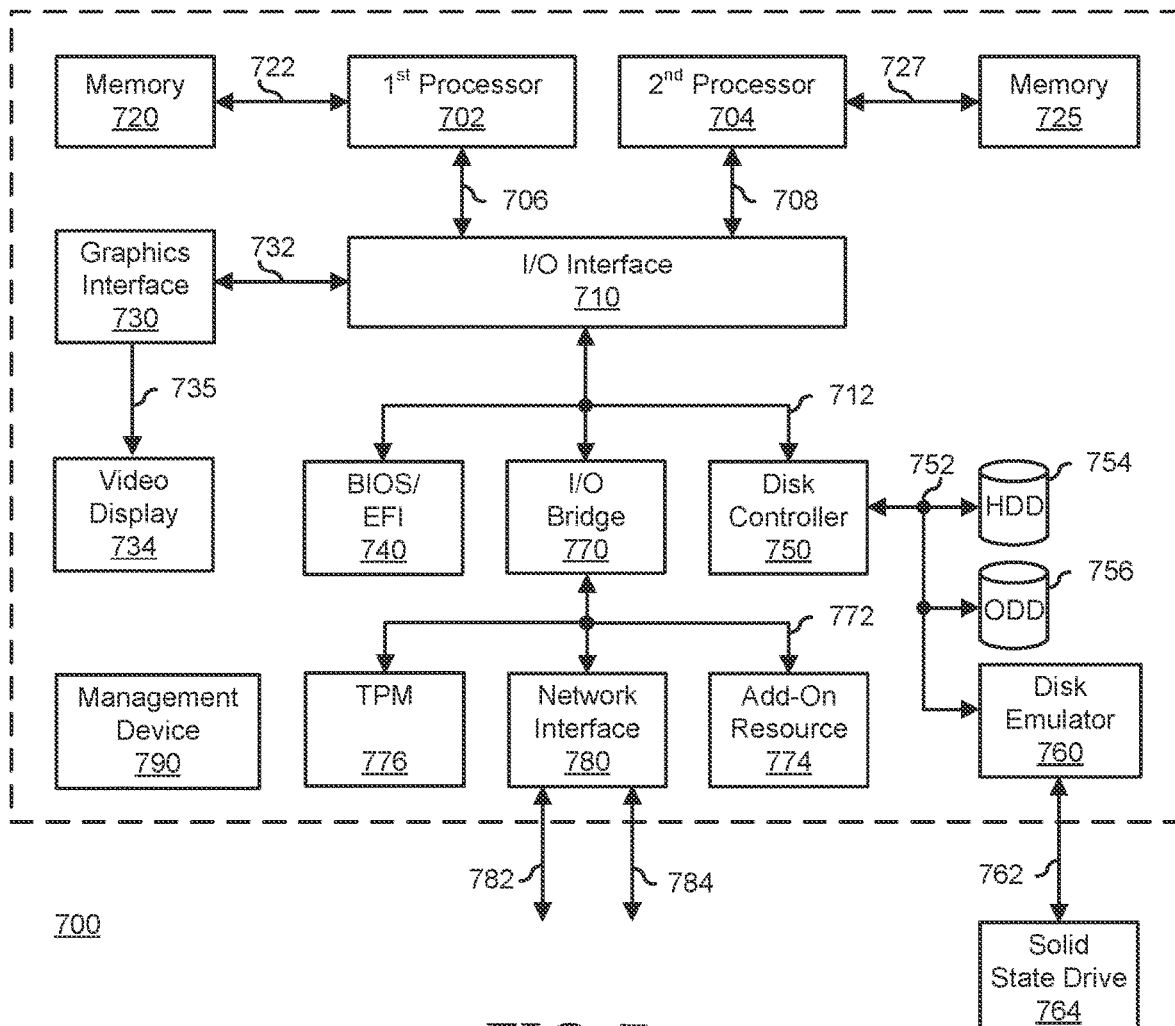
FIG. 7 is a block diagram of a general information handling system according to an embodiment of the present disclosure.

FIG. 7 shows a generalized embodiment of an information handling system 700 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display.

Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 7394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a memory configured to store a compliance node environment; and
    a processor to communicate with the memory, the processor to:
        create the compliance node environment; and
        in response to reception of a compliance update, the processor to:
            store the compliance update;
            based on the compliance update, determine a first compliance coverage for a first sub-domain of a compliance type in the compliance node environment;
            based on the first compliance coverage for the sub-domain, determine a second compliance coverage for the compliance type associated with the first sub-domain;
            in response to the sub-domain having incoming compliance relationship from multiple sub-domains with multiple compliance types, set a maximum compliance coverage for the sub-domain;
            update a security coverage for the sub-domain to the maximum compliance coverage, wherein the updated security coverage is a state change of the sub-domain; and
            in response the updated security coverage in the sub-domain, propagate the state change for the sub-domain to all connected sub-domains in the compliance node environment.

2. The information handling system of claim 1, wherein the calculation of the first compliance coverage for the first sub-domain includes the processor further to:
    determine different compliance percentages for different source sub-domains of the first sub-domain; and
    determine an average of the different compliance percentages to determine the first compliance coverage.

3. The information handling system of claim 1, wherein the calculation of the second compliance coverage for the compliance type includes the processor further to:
    determine different compliance coverages for each of a plurality of sub-domains of the compliance type, wherein the sub-domains of the compliance type includes the first sub-domain; and
    in determine an average of the different compliance coverage of the sub-domains to determine the second compliance coverage for the compliance type.

4. The information handling system of claim 1, wherein the first sub-domain has different compliance relationships with different sub-domains of other compliance types within the compliance node environment.

5. The information handling system of claim 4, wherein the processor further to determine a first compliance relationship between the first sub-domain and a second sub-domain of a second compliance type as being compliant based on the first compliance coverage of the first sub-domain being 100 percent.

6. The information handling system of claim 1, wherein the compliance node environment is associated with security for a product installed within the information handling system.

7. The information handling system of claim 6, wherein a security risk for the product is based on the first and second compliant coverages.

8. The information handling system of claim 1, wherein each sub-domain in the compliance node environment is both a source sub-domain and a destination sub-domain with respect to compliance coverages.

9. A method comprising:
    creating, by a processor of an information handling system, a compliance node environment;
    storing the compliance node environment in a memory of the information handling system; and
    in response to reception of a compliance update:
        storing the compliance update;
        based on the compliance update, calculating a first compliance coverage for a first sub-domain of a compliance type in the compliance node environment;
        based on the first compliance coverage for the sub-domain, calculating, by the processor, a second compliant coverage for the compliance type associated with the first sub-domain;
        in response to the first sub-domain having incoming compliance relationship from multiple sub-domains with multiple compliance types, setting a maximum compliance coverage for the first sub-domain;
        update a security coverage for the sub-domain to the maximum compliance coverage, wherein the updated security coverage is a state change of the sub-domain; and
        in response the updated security coverage in the sub-domain, propagate the state change for the sub-domain to all connected sub-domains in the compliance node environment.

10. The method of claim 9, the calculating of the first compliance coverage for the first sub-domain, the method further comprises:

determining different compliance percentages for different source sub-domains of the first sub-domain; and calculating an average of the different compliance percentages to determine the first compliance coverage.

11. The method of claim 9, wherein the calculating of the second compliance coverage for the compliance type, the method further comprises:

determine different compliance coverages for each of a plurality of sub-domains of the compliance type, wherein the sub-domains of the compliance type includes the first sub-domain; and calculating an average of the different compliance coverage of the sub-domains to determine the second compliance coverage for the compliance type.

12. The method of claim 9, wherein the first sub-domain has different compliance relationships with different sub-domains of other compliance types within the compliance node environment.

13. The method of claim 12, further comprising determining a first compliance relationship between the first sub-domain and a second sub-domain of a second compliance type as being compliant based on the first compliance coverage of the first sub-domain being 100 percent.

14. The method of claim 9, wherein compliance node environment is associated with security for a product installed within the information handling system.

15. The method of claim 9, wherein a security risk for the product is based on the first and second compliant coverages.

16. The method of claim 9, wherein each sub-domain in the compliance node environment is both a source sub-domain and a destination sub-domain with respect to compliance coverages.

17. A method comprising:

creating, by a processor of an information handling system, a compliance node environment;

storing the compliance node environment in a memory of the information handling system; and in response to reception of a compliance update:
storing the compliance update;
based on the compliance update:
determining different compliance percentages for different source sub-domains of a first sub-domain of a compliance type in the compliance node environment; and
calculating an average of the different compliance percentages to determine a first compliance coverage for the first sub-domain;
based on the first compliance coverage for the sub-domain:
determining different compliance coverages for each of a plurality of sub-domains of the compliance type, wherein the sub-domains of the compliance type includes the first sub-domain; and
calculating an average of the different compliance coverage of the sub-domains to determine a second compliance coverage for the compliance type;
in response to the first sub-domain having incoming compliance relationship from multiple sub-domains with multiple compliance types, setting a maximum compliance coverage for the first sub-domain;
update a security coverage for the sub-domain to the maximum compliance coverage, wherein the updated security coverage is a state change of the sub-domain; and
in response the updated security coverage in the sub-domain, propagate the state change for the sub-domain to all connected sub-domains in the compliance node environment.

18. The method of claim 17, wherein the first sub-domain has different compliance relationships with different sub-domains of other compliance types within the compliance node environment.

19. The method of claim 17, wherein compliance node environment is associated with security for a product installed within the information handling system.

20. The method of claim 17, wherein a security risk for the product is based on the first and second compliant coverages.

* * * * *